United States Patent
Rensin et al.

(10) Patent No.: US 7,277,927 B2
(45) Date of Patent: Oct. 2, 2007

(54) SYSTEMS AND METHODS FOR SAVING INTERNET CONTENT INTO A HANDHELD INTERNET APPLIANCE

(75) Inventors: David K. Rensin, Tiburon, CA (US); John Miniati, Menlo Park, CA (US); George Williams, Palo Alto, CA (US); Joshua Flank, Santa Clara, CA (US)

(73) Assignee: Earthlink, Inc., Atlanta, GA (US)

( * ) Notice: Subject to any disclaimer, the term of this patent is extended or adjusted under 35 U.S.C. 154(b) by 515 days.

(21) Appl. No.: 09/834,380

(22) Filed: Apr. 13, 2001

(65) Prior Publication Data

US 2002/0165926 A1 Nov. 7, 2002

(51) Int. Cl.
*G06F 15/16* (2006.01)

(52) U.S. Cl. .................. 709/219; 709/203; 709/217

(58) Field of Classification Search ............... 709/203, 709/217, 219, 223, 225; 707/10, 102, 6, 707/201; 715/810
See application file for complete search history.

(56) References Cited

U.S. PATENT DOCUMENTS

| | | | |
|---|---|---|---|
| 5,727,159 A | 3/1998 | Kikinis | |
| 5,857,201 A | 1/1999 | O'Grady et al. | |
| 6,000,000 A * | 12/1999 | Hawkins et al. | 707/201 |
| 6,088,700 A * | 7/2000 | Larsen et al. | 707/10 |
| 6,134,584 A * | 10/2000 | Chang et al. | 709/219 |
| 6,199,079 B1 * | 3/2001 | Gupta et al. | 707/6 |
| 6,311,058 B1 * | 10/2001 | Wecker et al. | 455/418 |
| 6,339,780 B1 * | 1/2002 | Shell et al. | 707/102 |
| 6,397,264 B1 * | 5/2002 | Stasnick et al. | 719/328 |
| 6,463,304 B2 * | 10/2002 | Smethers | 715/810 |
| 6,490,601 B1 * | 12/2002 | Markus et al. | 709/219 |
| 6,535,880 B1 * | 3/2003 | Musgrove et al. | 707/10 |
| 6,553,412 B1 * | 4/2003 | Kloba et al. | 709/219 |
| 6,691,111 B2 * | 2/2004 | Lazaridis et al. | 707/6 |
| 6,823,373 B1 * | 11/2004 | Pancha et al. | 709/219 |
| 2001/0054087 A1 * | 12/2001 | Flom et al. | 709/218 |

(Continued)

FOREIGN PATENT DOCUMENTS

EP 1 061 440 A 12/2000

(Continued)

OTHER PUBLICATIONS

OmniSky Announces Release 2.0, Business Wire, (Oct. 16, 2000), http://www.findarticles.com/p/articles/mi_m0EIN/is_2000_Oct_16/ai_66096479.*

(Continued)

*Primary Examiner*—Moustafa Meky
(74) *Attorney, Agent, or Firm*—Smith Frohwein Tempel Greenlee Blaha, LLC; Gregory Scott Smith

(57) ABSTRACT

Systems and methods for transferring Internet content displayed on a web site in a handheld Internet appliance to a local database in the handheld Internet appliance are provided. The systems and methods of the present invention consist of a software solution that enables users of handheld Internet appliances to automatically transfer information displayed on web sites to local databases associated with handheld Internet appliance applications. A user interface is provided in the web sites for enabling users to automatically transfer the information displayed on the web sites into the handheld Internet appliance.

8 Claims, 6 Drawing Sheets

U.S. PATENT DOCUMENTS

| | | | |
|---|---|---|---|
| 2002/0002453 A1* | 1/2002 | Lazaridis et al. | 704/9 |
| 2002/0010850 A1* | 1/2002 | Nelson et al. | 712/202 |
| 2002/0063678 A1* | 5/2002 | Wong | 345/156 |
| 2002/0077156 A1* | 6/2002 | Smethers | 455/566 |
| 2002/0087628 A1* | 7/2002 | Rouse et al. | 709/203 |
| 2002/0107755 A1* | 8/2002 | Steed et al. | 705/26 |

FOREIGN PATENT DOCUMENTS

| | | |
|---|---|---|
| WO | WO98/43177 A | 10/1998 |
| WO | WO99/46701 | 9/1999 |
| WO | WO 00/73921 | 12/2000 |
| WO | WO 00/79406 | 12/2000 |

OTHER PUBLICATIONS

OmniSky Licenses Handspring Blazer Browser Technology for Faster Web Browsing of More Websites, Wireless Developer Network, (Apr. 12, 2001), http://www.wirelessdevnet.com/news/2001/101/news3.html.*

Visto launches Mobile communications Platform, PR Newswire, Sep. 27, 2000.*

Omnisky licenses handspring blazer browser technology for faster web browsing of more websites, Business wire, P2018, Apr. 12, 2001.*

Schilit et al., "TeleWeb: Loosely Connected Access to the World Wide Web," *Computer Networks and ISDN Systems*, North Holland Publishing; Amsterdam, Netherlands; vol. 28 No. 11: pp. 1431-1444 (May 1, 1996).

Varhof, P., "Windows CE Ushers in Handheld PCs," *Computer Design* vol. 36 No. 2: pp. 18-22 (Feb. 1, 1997).

Gessler et al., "PDAs as Mobile WWW Browsers," *Computer Networks and ISDN Systems* vol. 28 No. 1: pp. 53-59 (Dec. 1, 1995).

Martin, et al., "The Privacy Practices of Web Browser Extensions," *Communications of the ACM* vol. 44 No. 2: pp. 45-50 (Feb. 2001).

"Helpful Facts About Personal Digital Assistants," Hewlett-Packard Company brochure, http://www.hp.com/hpinfo/newsroom/press/pdabrochure.htm, Dec. 2000.

"Thinmodem™," Card Access, Inc., web page, http://www.cardaccess-inc.com/thinmodem.html, Date Unknown.

"Handheld Modems," Novatel Wireless, Inc., web page, http://www.novatel.wireless.com/palmtop/index.html, Date Unknown.

"Minstrel V," Novatel Wireless, Inc., web page, http://www.novatelwireless.com/palmtop/minstrel5.html, Date Unknown.

"Palm Vx: Organize More, In Style," Palm Vx Datasheet, Palm Computing, Inc., Date Unknown.

"Palm VII: Wireless Internet Access Comes to the Palm Computing Platform," Palm VII White Paper, Palm Computing, Inc., Nov. 1998.

"Visor Handhelds: Visor Deluxe Details," Handspring, Inc., web page, http://www.handspring.com/products/visordeluxe, Date Unknown.

"Visor Handhelds: Visor Deluxe Solutions," Handspring, Inc., web page, http://www.handspring.com/products/visordeluxe, Date Unknown.

"Visor Handhelds: Visor Platinum Details," Handspring, Inc., web page, http://www.handpsring.com/products/visorpatinum, Date Unknown.

"Visor Handhelds: Visor Platinum Solutions," Handspring, Inc., web page, http://www.handpsring.com/products/visorpatinum, Date Unknown.

"HP Jornada 520 Series Overview & Features," Hewlett-Packard Company web page, http://www.hp.com/jornada/products/520/overview.html, Date Unknown.

"Samsung Launches PDA Phone," Telecommunications News, Samsung Electronics Co., Ltd., web page, Dec. 20, 2000.

"PDA Phone: PDA and Mobile Phone," CeBIT2001 Trade Show, Samsung Electronics Co., Ltd., web page, Mar. 2001.

W. Mossberg, "Wireless Phone and Palm Are United in Smartphone," The Wall Street Journal, Personal Technology Section, Mar. 8, 2001.

"Kyocera's Smartphone Series," QCP 6035 Datasheet, Kyocera Wireless Corp., 2001.

"Create CooletsTM," Coola, Inc., web page, http://www.coola.com/coolets, Date Unknown.

* cited by examiner

```
<HTML>
<HEAD></HEAD>
<BODY>
<FORM NAME="HTML_form_name" ACTION="HTML_form_action">
    First name:  <INPUT TYPE="TEXT" NAME="input_first_name"
                  VALUE="Frank" <BR>
    Last name:   <INPUT TYPE="TEXT" NAME="input_last_name"
                  VALUE="Dawson"><BR>
    Work number: <INPUT TYPE="TEXT" NAME="input_work_number"
                  VALUE="(617) 693-8728"><BR>
</FORM>

<script language="xml" type="text/plain">
<xml>
    <?xml version="1.0"?>
    <OSvCard version="3.0" prodid="-//HandGen//NONSGML vGen v1.0//EN">
        <FORM>
            <NAME>HTML_form_name</NAME>
            <ACTION>HTML_form_action</ACTION>
        </FORM>
        <N>
    <FAMILY>input_last_name</FAMILY>
    <GIVEN>input_first_name</GIVEN>
        </N>
        <TEL TEL.TYPE="WORK">input_work_number</TEL>
    </OSvCard>
</xml>
</script>

</BODY>
</HTML>
```

FIG. 3

```
<HTML>
<HEAD></HEAD>
<BODY>
<FORM NAME="HTML_form_name" ACTION="HTML_form_action">
    First name:    <INPUT TYPE="TEXT" NAME="input_first_name"
                   VALUE="Frank" <BR>
    Last name:     <INPUT TYPE="TEXT" NAME="input_last_name"
                   VALUE="Dawson"><BR>
    Work number:   <INPUT TYPE="TEXT" NAME="input_work_number"
</FORM>             VALUE="(617) 693-8728"><BR>
```

*<a
href=palmcall:OS_OneTap?ActiveDataType=OSvCard&AddressType=BCard&input_first_name
=^FirstName&input_last_name=^LastName&input_work_number=^WorkNumber button>
Save Contact</a>*

```
</BODY>
</HTML>
```

FIG. 4

SYSTEMS AND METHODS FOR SAVING INTERNET CONTENT INTO A HANDHELD INTERNET APPLIANCE

FIELD OF THE INVENTION

This invention relates generally to systems and methods for saving Internet content into a handheld Internet appliance. More specifically, the present invention provides systems and methods for loading Internet content into a local database associated with a handheld Internet appliance application.

BACKGROUND OF THE INVENTION

The Internet and the World Wide Web (hereinafter "the web") have revolutionized the ways in which information is disseminated and shared. At any given time, the Internet enables millions of users worldwide to simultaneously access a wide variety of information and engage in activities as diverse as shopping, playing games, financial trading, among others.

At present, users can access Internet information through various "Internet appliances", which are electronic devices configured with an Internet access system. Internet appliances include, but are not limited to, microprocessor based devices such as personal and portable computers, and handheld appliances such as personal digital assistants and electronic organizers.

Typically, the information is accessed through a connection to a "web page", a multimedia composition that may contain text, audio, graphics, imagery, video, and nearly any other type of content that may be experienced through use of a computer or other electronic device. A web page may also be interactive, and contain user selectable links that cause other web pages to be displayed, forms that may be used by the user to submit information requested in the web page, interactive executable code, or other elements through which the user may interact with web pages. A group of one or more interconnected and closely related web pages is referred to as a "web site".

A web site has a particular address associated with it called a Uniform Resource Locator ("URL"). To view a particular web site, users input its corresponding URL on a "web browser window" displayed by "web browser software", such as Internet Explorer, available from Microsoft Corporation, of Redmond, Wash. The web browser software runs on the user's Internet appliance and is responsible for fetching the information displayed on the web site from a "web server" using a transfer protocol such as the HyperText Transfer Protocol ("HTTP").

While most of the traffic on the Internet is initiated from personal computers, the growing demand by mobile business users to have access to Internet information from anywhere in the world has led to the development of various Internet access technologies for handheld Internet appliances such as wireless telephones and personal digital assistants ("PDAs"). In particular, it has become increasingly popular to access information available in the Internet via PDAs, such as the Palm handheld devices manufactured by Palm, Inc., of Santa Clara, Calif., the Handspring Visor manufactured by Handspring, Inc., of Mountain View, Calif., and the HP Jornada manufactured by the Hewlett-Packard Company of Palo Alto, Calif.

A PDA provides computing and information storage and retrieval capabilities for personal or business use, often for keeping schedule calendars and address book information handy. Information is accessed by means of an electronically sensitive pad on which handwriting can be received. Currently available PDAs contain a number of useful local applications including an address book, a calendar, a memo pad, a calculator, and a to-do list, among others. Users are provided with a special pen called a stylus to write on the pad and "tap" on icons on the PDA screen corresponding to the PDA applications. In addition, PDA expansion slots may be used to enhance the PDA capabilities with a digital camera, a GPS receiver, a scanner, and other devices. Recently developed PDAs such as the PDA Phone manufactured by Samsung Electronics, Co., Ltd., of Seoul, South Korea, and the Kyocera QCP 6035 Smartphone manufactured by Kyocera Wireless Corp., of San Diego, Calif., combine the functionalities of a PDA and a wireless phone into a single handheld appliance.

The Internet is accessed on a PDA by means of a wireless modem and Internet access software. The wireless modem may either be internally integrated into the PDA such as in the case of the Palm VIIx, manufactured by Palm, Inc., or connected externally as an expansion module. External wireless modems include the Thinmodem manufactured by Card Access, Inc., of American Fork, Utah, and the various modems manufactured by Novatel Wireless, Inc., of San Diego, Calif. The Internet access software may consist of a microbrowser, which is a simpler version of a web browser with reduced graphic capabilities, and a variety of APIs (application program interfaces) and associated applications for formatting and displaying web pages on the PDA screen.

There are many advantages in being able to access the Internet with a PDA. The PDA is extremely mobile and can be utilized by business persons and consumers who are traveling or otherwise do not have access to a desktop computer. The PDA enables business persons and consumers to manage, share, and secure the information needed on a daily basis. A PDA user can access the Internet to read e-mails, search for a restaurant, obtain a map and driving directions, purchase airline tickets or shop, all without the need for a traditional, desktop computer.

However, accessing the Internet using a PDA has several drawbacks. First, the wireless Internet connection may be unreliable, and the user may have to wait a significant amount of time to receive the requested information. Second, it can be a very time consuming process, requiring users to work through many options in order to access the desired information. Lastly, it can be extremely cumbersome for the user to save the desired information into the PDA.

For instance, a user who is accessing the Internet on a PDA to read e-mail may want to save an e-mail address into the PDA's address book. To save the e-mail address into the address book, the user is required to perform a number of steps, including: (1) connecting to the Internet; (2) starting the e-mail application to read the e-mail; (3) copying the e-mail address; (4) quitting the e-mail application; (5) starting the address book application; and (6) pasting the e-mail address into the address book.

In order to make travel arrangements on-line and save the travel information on the PDA's calendar, the user must first connect to a web site for making travel reservations before starting the calendar application, and then manually enter the departure date, time, location and destination, as well as a return date and time into the calendar. Similarly, a user who is browsing a financial web site to trade stocks and wants to use the PDA's calculator application to compute his financial gains for a particular stock must first connect to the web site to get the stock pricing information before starting the calculator application and manually entering the stock pricing information in the calculator application.

Alternatively, the user may launch a web site directly from a local application as described in U.S. application Ser. No. 09/834,376, filed on Apr. 13, 2001. The user must still, however, manually select the information from the web site and paste it into the local application. There are currently no mechanisms in place for the user to automatically load Internet content into a handheld Internet appliance and to automatically post Internet content displayed on a web site into another web site. In short, it can be inordinately difficult and time consuming for the PDA user to transfer information from the Internet into local applications in a handheld Internet appliance.

To address this difficulty, Coola, Inc., of Woburn, Mass., has developed a set of APIs and a server technology that enables users to automatically transfer information from web sites into handheld Internet appliances. The APIs are used to insert user interface buttons on the web sites. When the buttons are pressed by the user, the APIs convert information from the web site into a special format called "coolet". The coolet is sent to a centrally located server before transferring the information into the user's PDA. The information is transferred into the PDA only after the user synchronizes the PDA with a personal computer.

While this solution enables users to easily transfer information from web sites into their PDAs, it has the drawback of requiring the user to first synchronize the PDA with a personal computer before the information is transferred into the PDA. Considering that PDAs are a mobile device, users often need to transfer information from web sites into their PDAs while on the road and without access to a personal computer. For example, users on business trips who need to handle a business crisis on the road may need to download information from a web site and transfer the information into a memo pad on the PDA before boarding on an airplane. In this case, the user does not have access to the personal computer and cannot easily transfer the information into the PDA.

In view of the foregoing drawbacks, it would be desirable to provide systems and methods for automatically loading information available in the Internet into a local database associated with a handheld Internet appliance application.

It further would be desirable to provide systems and methods for automatically transferring information from a web site into a handheld Internet appliance without requiring a user to synchronize the handheld Internet appliance with a personal computer.

It also would be desirable to provide systems and methods for formatting and inserting user interfaces on a web site displayed on a handheld Internet appliance to enable a user to automatically transfer information from the web site into the handheld Internet appliance.

SUMMARY OF THE INVENTION

In view of the foregoing, it is an object of the present invention to provide systems and methods for automatically loading information available in the Internet into a local database associated with a handheld Internet appliance application.

It is another object of the present invention to provide systems and methods for automatically transferring information from a web site into a handheld Internet appliance without requiring a user to synchronize the handheld Internet appliance with a personal computer.

It is also an object of the present invention to provide systems and methods for formatting and inserting user interfaces on a web site displayed on a handheld Internet appliance to enable a user to automatically transfer information from the web site into the handheld Internet appliance.

These and other objects of the present invention are accomplished by providing systems and methods for automatically transferring Internet content into a handheld Internet appliance. The systems and methods consist of a software solution that enables web site content to be "active" when displayed on a handheld Internet appliance. The active content can be automatically loaded into local databases associated with handheld Internet appliance applications, or it can be posted to another web site displayed on the handheld Internet appliance. The web sites are formatted for display on the handheld Internet appliance and include user interfaces to enable users to transfer information from a web site into the handheld Internet appliance applications or into another web site. The information is transferred automatically, without having to wait for users to synchronize the handheld Internet appliance with a personal computer prior to having access to the information.

In a preferred embodiment, the systems and methods of the present invention involve three main software components: (1) a web site API; (2) a software plug-in; and (3) a user interface. The web site API is inserted into each web site from which users may transfer information to their local handheld Internet applications. The API invokes the software plug-in that implements the functions required to automatically load information from a web site into local databases of handheld Internet appliances or into other and to automatically post the information into another web site. The information that can be loaded from a particular web site is defined by the API inserted on that web site. The software plug-in also enables users to launch a web site directly from a local application as described in U.S. application Ser. No. 09/834,376, filed on Apr. 13, 2001. In addition, the software plug-in automatically fills on-line forms on web sites with data stored in local handheld Internet appliance databases as described in U.S. application Ser. No. 09/834,379 filed on Apr. 13, 2001.

In a preferred embodiment, the web site API is referred to as the OneTap™ API, the software plug-in is referred to as the OneTap™ software plug-in, and the user interface is referred to as the OneTap™ user interface.

Advantageously, the present invention enables users to automatically transfer information from web sites into local handheld Internet appliance databases without requiring users to synchronize the handheld Internet appliance with a personal computer prior to having access to the information.

In addition, the present invention inserts user interfaces on web sites displayed on a handheld Internet appliance to enable users to automatically transfer information from the web site into the handheld Internet appliance.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which:

FIG. 3 is an illustrative view of the HTML source code of a web page containing the web site API;

FIG. 4 is an illustrative view of the HTML source code of FIG. 3 formatted for display on the handheld Internet appliance;

DETAILED DESCRIPTION OF THE INVENTION

Figure 1:
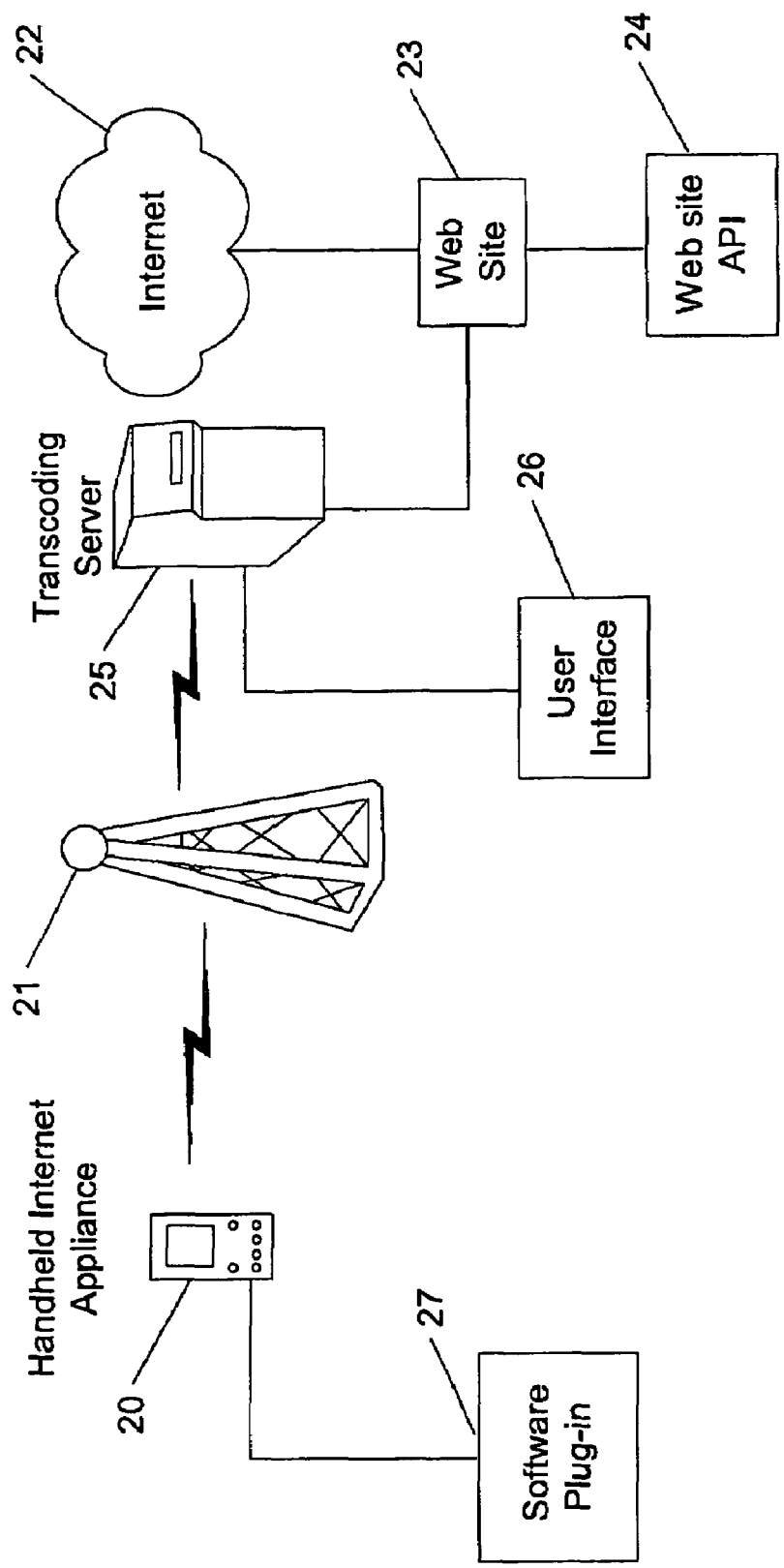
FIG. 1 is a schematic view of the system and the network environment in which the present invention operates.

Referring to FIG. 1, a schematic view of the system and the network environment in which the present invention operates is described. Handheld Internet appliance 20 uses a wireless modem and Internet access software to connect to Internet 22 by means of a wireless network represented by base station 21. Handheld Internet appliance 20 may consist of a personal digital assistant (PDA) such as the Palm handheld devices manufactured by Palm, Inc., of Santa Clara, Calif., the Handspring Visor manufactured by Handspring, Inc., of Mountain View, Calif., and the HP Jornada manufactured by the Hewlett-Packard Company of Palo Alto, Calif. Handheld Internet appliance 20 may also consist of appliances having the functions of a PDA and a cellular phone, such as the PDA Phone manufactured by Samsung Electronics, Co., Ltd., of Seoul, South Korea, and the Kyocera QCP 6035 Smartphone manufactured by Kyocera Wireless Corp., of San Diego, Calif.

Handheld Internet appliance 20 has an electronically sensitive pad and screen on which handwriting can be received and visualized. Handheld Internet appliance 20 typically contains a number of useful local applications including an address book, a calendar, a memo pad, a calculator, a to-do list, a web browser, and a word processing application, among others. Additional software applications such as games, spreadsheet programs, document processors, dictionaries, and others, may be easily added to handheld Internet appliance 20. Users are provided with a special pen called a stylus to write on the pad and "tap" on icons on the screen corresponding to the available applications. Handheld Internet appliance 20 has a main menu to display the application icons to the user. In addition, expansion slots may be used to enhance the capabilities of handheld Internet appliance 20 with a digital camera, a GPS receiver, a scanner, and other devices.

To protect the data saved in handheld Internet appliance 20, a synchronization technology may be used to synchronize the data from handheld Internet appliance 20 to a personal computer. Like a personal computer, handheld Internet appliance 20 has an operating system to manage its applications, input and output functions and devices, memory sharing, among other functions. Examples of currently available operating systems for handheld Internet appliance 20 include the Palm OS, developed by Palm, Inc., and the Windows CE, developed by Microsoft Corporation, of Redmond, Wash.

Handheld Internet appliance 20 connects to Internet 22 by means of a wireless modem. The wireless modem may be internally integrated into handheld Internet appliance 20 such as in the case of the Palm VIIx, manufactured by Palm, Inc., or connected externally as an expansion module. External wireless modems include the Thinmodem manufactured by Card Access, Inc., of American Fork, Utah, and the various modems manufactured by Novatel Wireless, Inc., of San Diego, Calif. In addition to the wireless modem, handheld Internet appliance 20 requires Internet access software to enable users to connect to the Internet. The Internet access software may consist of a microbrowser, which is a simpler version of a web browser with reduced graphic capabilities, and a variety of APIs (application program interfaces) and associated applications for formatting and displaying web pages on the PDA screen.

Handheld Internet appliance 20 has software plug-in 27 to implement the functions required to automatically load information from web site 23 into local databases of handheld Internet appliance 20 and to automatically post information from web site 23 into another web site. In addition, software plug-in 27 enables users to launch a web site directly from a local application as described in copending, U.S. application Ser. No. 09/834,376, filed on Apr. 13, 2001, and to fill on-line forms on web sites with data stored in local handheld Internet appliance databases as described in copending, U.S. application Ser. No. 09/834,376, filed on Apr. 13, 2001.

In a preferred embodiment, the web site API is referred to as the OneTap™ API, the software plug-in is referred to as the OneTap™ software plug-in, and the user interface is referred to as the OneTap™ user interface.

Handheld Internet appliance 20 contains a number of local databases corresponding to each local application to store the data records entered by the user. For instance, the address book application of handheld Internet appliance 20 has a local database associated with it to store the addresses in the address book, and the calendar application of handheld Internet appliance 20 has a local database associated with it to store the calendar items.

Users of handheld Internet appliance 20 connect to Internet 22 to access e-mail and various web sites, such as web site 23, that are formatted for proper display on the screen of handheld Internet appliance 20. Web site API 24 is inserted into web site 23 for invoking software plug-in 27 in handheld Internet appliance 20. Web site API 24 is required for software plug-in 27 to load information from web site 23 into local databases in handheld Internet appliance 20 and to post the information from web site 23 into another web site. The information from web site 23 that can loaded into handheld Internet appliance 20 or posted to another web site is defined by web site API 24. When a user requests web site 23 on handheld Internet appliance 20, transcoding server 25 checks web site 23 to verify the presence of web site API 24.

Transcoding server 25 also properly formats web site 23 for display by handheld Internet appliance 20. In addition, if web site API 24 is present on web site 23, transcoding server 25 inserts user interface 26 on web site 23 with links to software plug-in 27. User interface 26 consists of a button that, when tapped, displays a menu for saving selected information from web site 23 into a local database in handheld Internet appliance 20. The menu lists options that may be selected by the user to save information from web site 23 into handheld Internet appliance 20. For example, the menu may list an option for saving a restaurant address displayed on web site 23 into the address book of handheld Internet appliance 20. Each item listed on the menu has a link to software plug-in 27 to properly save the information displayed on web site 23 into a local database in handheld Internet appliance 20.

Figure 2:
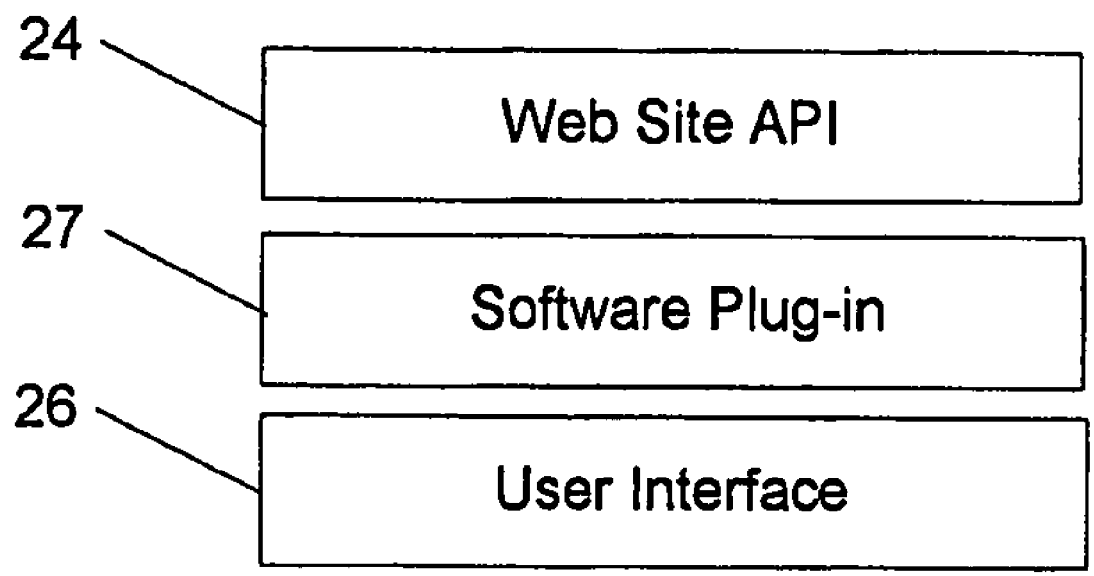
FIG. 2 is a schematic view of the software components of the present invention.

Referring now to FIG. 2, a schematic view of the software components of the present invention is described. The software components consist of: (1) web site API 24; (2) software plug-in 27; and (3) user interface 26.

Web site API 24 is inserted into each web page containing information that may be saved by a user into handheld Internet appliance 20. API 24 invokes software plug-in 27 to save information from web site 23 into local databases in handheld Internet appliance 20. API 24 also defines the information from web site 23 that can be loaded into the local databases or posted to another web site. For example, in a web site displaying travel reservations, the API may define the departure and arrival date and times to be saved into the local database associated with the calendar application, and in a web site displaying a restaurant address, the API may define the address to be saved into the address book application or posted into a web site that maps the restaurant address. In this case, the address replaces the parameters in the web site's URL associated with an address to be mapped.

Software plug-in 27 implements the functions required to automatically transfer information from web site 23 into local databases in handheld Internet appliance 20, and to automatically post the information from web site 23 into another web site. Software plug-in 27 implements the following functions: (1) retrieves the information from web site 23 to be saved in handheld Internet appliance 20; (2) formats the information to be saved according to the local database to which the information is going to be transferred; (3) loads the formatted information into a local database in handheld Internet appliance 20; and (4) replaces parameters associated with the information on a web site's URL. In addition, software plug-in 27 enables users to launch a web site directly from a local application as described in U.S. application Ser. No. 09/834,376, filed on Apr. 13, 2001, and to fill online forms on web sites with data stored in local handheld Internet appliance databases as described in U.S. application Ser. No. 09/834,379 filed on Apr. 13, 2001.

User interface 26 lists options that may be selected by the user to save information from web site 23 into handheld Internet appliance 20. User interface 26 consists of one or more buttons that, when tapped, display a menu for saving information from web site 23 into a local database in handheld Internet appliance 20. For example, the menu may list an option for saving a restaurant address displayed on web site 23 into the address book of handheld Internet appliance 20.

Referring now to FIG. 3, an illustrative view of the HTML source code of a web page containing the web site API is described. HTML source code 28 shows contact information 29 that may be saved by the user into the address book application. HMTL source code 28 also contains XML code 30 corresponding to web site API 24.

Referring now to FIG. 4, an illustrative view of the HTML source code of FIG. 3 formatted for display on the handheld Internet appliance is described. HTML code 31 is the formatted version of HTML code 28 of FIG. 3 for proper display on handheld Internet appliance 20. Upon encountering XML code 28 corresponding to web site API 24, transcoding server 25 formats HTML code 28 to replace XML code 30 with link 32. Link 32 is a link to the appropriate function of software plug-in 27 to save contact information 29 into a local database of handheld Internet appliance 20. In case handheld Internet appliance 20 is running the Palm OS, link 32 consists of a "palmcall". Link 32 also contains user interface 33, represented by a "Save Contact" button. When tapped by the user, "Save Contact" button invokes software plug-in 27 to save contact information 29 into a local database in handheld Internet appliance 20.

Figure 5:
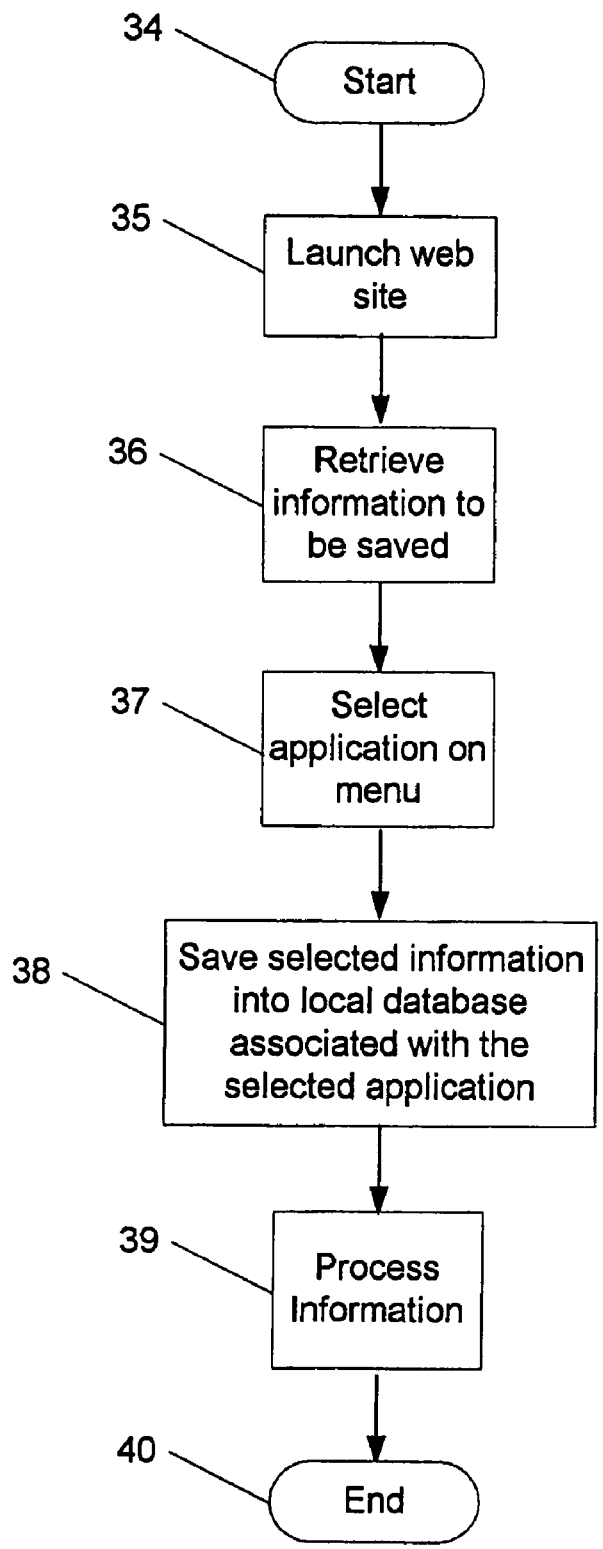
FIG. 5 is a flowchart for using the systems and methods of the present invention to automatically save information from a web site into a local database of a handheld Internet appliance.

Referring now to FIG. 5, a flowchart for using the systems and methods of the present invention to automatically save information from a web site into a local database of a handheld Internet appliance is described. At step 35, the user launches a web site displaying information that the user may want to save into the handheld Internet appliance. For example, if the user is accessing a web site for making travel reservations, the user may want to save the travel reservation into the calendar application of the handheld Internet appliance or send an e-mail to his secretary with the travel reservation information included as an e-mail attachment.

The web site has a user interface to enable the user to save the web site content into the handheld Internet appliance. The user interface consists of a button inserted on the web site that, when tapped, displays a menu listing options that may be selected by the user for saving the web site content into the handheld Internet appliance. For example, the menu may list a "save address" option for saving an address displayed on a web site into the local database associated with the address book application, a "mark date" option for saving a travel departure date on the local database associated with the calendar application, and saving a restaurant address displayed on web site 23 into the address book of handheld Internet appliance 20.

At step 36, software plug-in 27 retrieves the information to be saved into a local database in the handheld Internet appliance. The information may be, for example, an address, a date, a travel reservation, or any other content displayed on web sites properly formatted for the handheld Internet appliance. At step 37, the user selects a local application in handheld Internet appliance 20 for saving the web site content. For example, if the user is saving an address into the handheld Internet appliance, the user selects an option in the menu for saving the address into the local database associated with the address book application.

Figure 6:
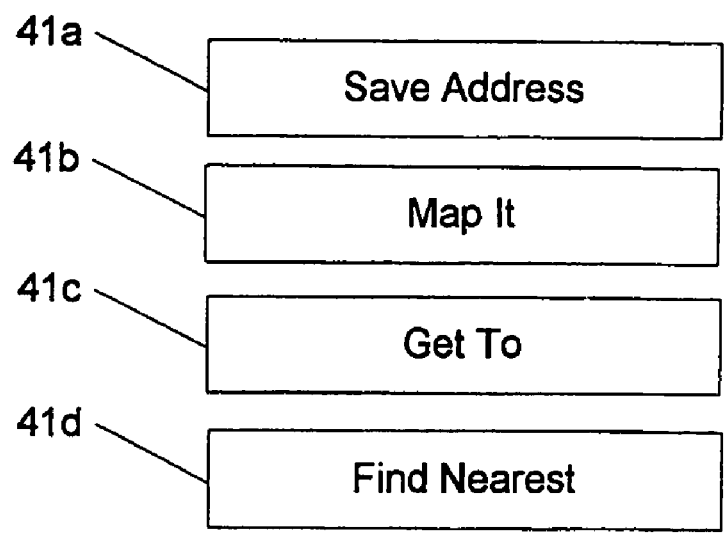
FIG. 6 is an illustrative view of menu options accessible from a web site displaying an address.

Referring now to FIG. 6, an illustrative view of menu options accessible from a web site displaying an address is described. Menu options 41a-d are displayed in response to a user's tap on a button provided on a web site displaying an address. The button is defined by web site API 24 inserted on the web site's HTML source code. Web site API 24 is also responsible for selecting the address on the web site that is active for loading into the handheld Internet appliance.

Menu option 41a enables the user to save the address displayed to the local database associated with the address book application. Menu option 41b enables the user to get a map to the address displayed on the web site. By selecting option 41b, a mapping web site is displayed on the handheld Internet appliance with a map to the address selected. The user does not need to manually enter the address into the mapping web site. Rather, software plug-in 27 automatically replaces the address parameters on the mapping web site's URL with the address selected by the user. Similarly, menu option 41c launches a web site displaying driving directions to the address selected, while menu option 41d launches a web site displaying commercial locations that are nearest to the address selected.

Figure 7:
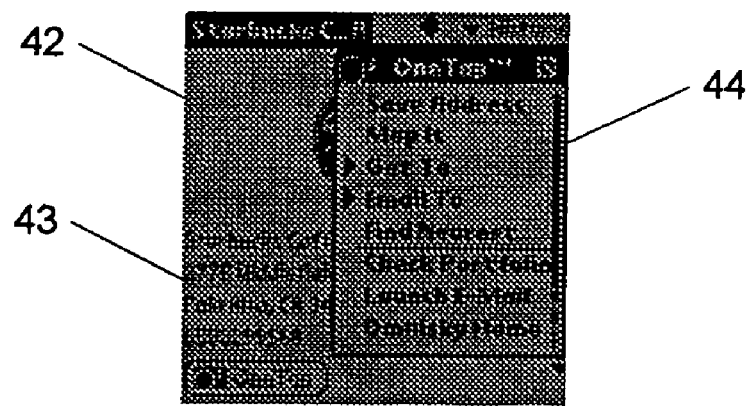
FIG. 7 is an illustrative view of a handheld Internet appliance screen displaying a web site containing an address that may be loaded into the handheld Internet appliance.

Referring now to FIG. 7, an illustrative view of a handheld Internet appliance screen displaying a web site containing an address that may be loaded into the handheld Internet appliance or posted to other web sites is described. Handheld Internet appliance screen 42 is displaying a web site containing address 43 to a coffee shop. A user taps onto a button inserted on the web site by web site API 24 to open menu 44. Menu 44 enables the user to save address 43 to the address book, launch a web site to display a map to address 43, get driving directions to address 43, and find commercial locations near to address 43.

Although particular embodiments of the present invention have been described above in detail, it will be understood that this description is merely for purposes of illustration. Specific features of the invention are shown in some drawings and not in others, and this is for convenience only and any feature may be combined with another in accordance with the invention. Steps of the described processes may be reordered or combined, and other steps may be included. Further variations will be apparent to one skilled in the art in light of this disclosure and are intended to fall within the scope of the appended claims.

What is claimed is:

1. A method for automatically transferring information from a website displayed on a handheld Internet appliance into a local database in the handheld Internet appliance, the method comprising:

determining the information to be transferred with a web site application program interface;

selecting a plurality of options available on a web site user interface for transferring the information from a first web site into the handheld Internet appliance, wherein the first web site includes the web site user interface, the web site user interface comprises a button in the first web site, the button comprising a menu displaying menu options for transferring the information from the first web site into the handheld Internet appliance, the menu options comprising: an option for saving the information from an already open web site into a local application; and a plurality of options for launching a second web site displaying content associated with the information from the already open web site; and automatically transferring the information from the web site into the local database in the handheld Internet appliance using a software plug in, the transfer performing all necessary format conversions and taking place independent from a synchronization operation.

2. The method of claim 1, wherein the local application comprises the address book application and the option for saving the information from the web site comprises saving an address from the web site into the address book application.

3. The method of claim 1, wherein the plurality of options for launching a second web site comprises: launching a second web site to map an address displayed on the already open web site; launching a second web site to find driving directions to the address displayed on the already open web site; and launching a second web site to find commercial locations nearest to the address displayed on the already open web site.

4. A method for automatically transferring information from a web site displayed on a handheld Internet appliance into a local database in the handheld Internet appliance into a local database in the handheld Internet appliance, the method comprising:

determining the information to be transferred with a web site application program interface;

selecting a plurality of options available on a web site user interface for transferring the information from a first web site into the handheld Internet appliance; and automatically transferring through operation of a software plug in, the information from the first web site into the local database in the handheld Internet appliance, the transfer performing all necessary format conversions and taking place independent from a synchronization operation, wherein the software plug-in comprises software routines for: retrieving the information from the first web site to be saved in the handheld Internet appliance; formatting the information to be saved according to the local database to which the information is going to be transferred; loading the formatted information into the local database in the handheld Internet appliance; replacing parameters associated with the information on a second web site's URL; automatically launching a second local application from an already open first local application in the handheld Internet appliance; automatically launching a web site from the first local application; and automatically filling on-line forms of a web site with a data record stored in the local database in the handheld Internet appliance.

5. A system for automatically transferring information from a web site displayed on a handheld Internet appliance into a local database in the handheld Internet appliance, the system comprising:

an application program interface inserted in the web site for determining the information to be transferred into the handheld Internet appliance;

a user interface inserted in the web site for selecting a plurality of options for transferring the information from the web site into the handheld Internet appliance, wherein inserting the user interface in the web site comprises inserting a button in the web site, the button comprising a menu displaying menu options for transferring the information from the web site into the handheld Internet appliance, the menu options comprise: an option for saving the information from an already open web site into a local application; and a plurality of options for launching a second web site displaying content associated with the information from the already open web site; and a software plug-in in the handheld Internet appliance to automatically transfer the information from the web site into the local database in the handheld Internet appliance, the software plug-in performing all necessary data translations and being invoked in response to a single actuation by the user.

6. A system for automatically transferring information from a web site displayed on a handheld Internet appliance into a local database in the handheld Internet appliance, the system comprising:

an application program interface inserted in a first web site for determining the information to be transferred into the handheld Internet appliance;

a user interface inserted in the first web site for selecting a plurality of options for transferring the information from the first web site into the handheld Internet appliance; and a software plug-in to automatically transfer the information from the first web site into the local database in the handheld Internet appliance, the software plug-in performing all necessary data translations and being invoked in response to a single actuation by the user and comprising software routines for: retrieving the information from the first web site to be saved in the handheld Internet appliance; formatting the information to be saved according to the local database to which the information is going to be transferred; loading the formatted information into the local database in the handheld Internet appliance; replacing parameters associated with the information on a second web site's URL; automatically launching a second local application from an already open first local application in the handheld Internet appliance; automatically launching a web site from the already open local application; and automatically filling on-line forms of a web site with a data record stored in the local database in the handheld Internet appliance.

7. A handheld Internet appliance comprising a plurality of software components for transferring information from a web site into a local database in the handheld Internet appliance, the software components comprising:
- an application program interface inserted in the web site for determining the information to be transferred;
- a user interface inserted in the web site for selecting a plurality of options for transferring the information from the web site into the handheld Internet appliance, wherein inserting the user interface in the web site comprises inserting a button in the web site, the button comprising a menu displaying menu options for transferring the information from the web site into the handheld Internet appliance, the menu options comprising: an option for saving the information from an already open web site into a local application; and a plurality of options for launching a second web site displaying content associated with the information from the already open web site; and
- a software plug-in to automatically transfer the information from the web site into the local database in the handheld Internet appliance independent of a synchronization application and in response to a single or no actuation by a user.

8. A handheld Internet appliance comprising a plurality of software components for transferring information from a web site into a local database in the handheld Internet appliance, the software components comprising:
- an application program interface inserted in a first web site for determining the information to be transferred;
- a user interface inserted in the first web site for selecting a plurality of options for transferring the information from the first web site into the handheld Internet appliance; and
- a software plug-in to automatically transfer the information from the first web site, which is already open, into the local database in the handheld Internet appliance independent of a synchronization application and in response to a single or no actuation by a user and comprising software routines for: retrieving the information from the already open first web site to be saved in the handheld Internet appliance; formatting the information to be saved according to the local database to which the information is going to be transferred; loading the formatted information into the local database in the handheld Internet appliance; replacing parameters associated with the information on a second web site's URL; automatically launching a second local application from an already open first local application in the handheld Internet appliance; automatically launching a web site from the already open first local application; and automatically filling on-line forms of a web site with a data record stored in the local database in the handheld Internet appliance.

\* \* \* \* \*